Nov. 22, 1927.  
S. OTTO ET AL  
1,649,974  
EVAPORATOR FOR REFRIGERATING APPARATUS  
Original Filed Jan. 18, 1923

Inventors  
Stuart Otto  
and  
Jack C. Jenkins  
By their Attorneys  
Dean Fairbank Obright & Hirsh Patented Nov. 22, 1927.

1,649,974

UNITED STATES PATENT OFFICE.

STUART OTTO, OF WILTON, CONNECTICUT, AND JACK C. JANKUS, OF SCRANTON, PENNSYLVANIA, ASSIGNORS TO GAS REFRIGERATION CORPORATION, OF SCRANTON, PENNSYLVANIA, A CORPORATION OF DELAWARE.

EVAPORATOR FOR REFRIGERATING APPARATUS.

Original application filed January 18, 1923, Serial No. 613,442. Divided and this application filed November 2, 1926. Serial No. 145,764.

This application is a division of our prior application Serial No. 613,442, filed January 18th, 1923.

This invention is an improvement in evaporators for liquefied refrigerant, and adapted for use in refrigerators, cooling chambers, or the like. The invention relates particularly to that type in which the evaporator serves as a receiver for the liquefied refrigerant, and is alternately filled during the liquefying of the gas under pressure, and then slowly emptied by reduction of the pressure of the gas and the resulting evaporation of the liquid to produce the desired cooling effect.

In refrigerating systems of the absorption type, it sometimes happens, due to improper regulation, failure of condenser water, or other causes, that some of the absorbent which is far less volatile than the liquefied gas, passes through the condenser and collects in the evaporator where it interferes with the proper and efficient operation of the system. It is theoretically impossible to separate all the moisture from ammonia gas after boiling it from water as an absorbent even with ideally perfect construction of rectification and dehydration apparatus.

One important feature of our invention resides in the novel means employed for automatically effecting a withdrawal of liquid at intervals from the evaporator, and returning it to the absorber, so as to prevent the accumulation of liquid of a character which is not readily volatile in the evaporator.

In carrying out our invention, we provide means whereby the liquid which accumulates at the bottom of the evaporator and which contains the substantially non-volatile absorbent, is caused to flow to a chamber adjacent to or in the upper part of the evaporator and from which it is returned to the still or absorber automatically during the cooling period. The invention involves other features of construction and other advantages, which will be pointed out hereinafter or will be apparent from a consideration of the forms illustrated in the drawings. In these drawings.

Figure 1:
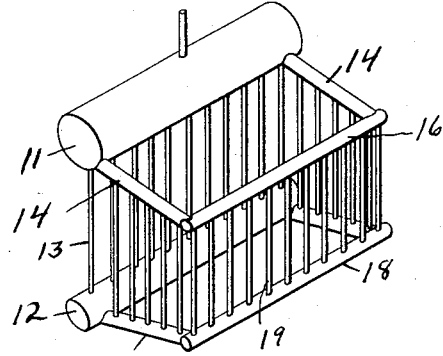
Fig. 1 is a perspective view of an evaporator in which may be incorporated the novel features of our invention.

Our improved evaporator is particularly adapted for use in that system in which a liquefiable gas is driven out of an absorbent liquid by heating the liquid in a still, and the gas passes under the pressure of the still, through a condenser where it is cooled to such a point that it liquefies under pressure. The liquefied gas is delivered to the evaporator. Upon the shutting off of the heat from the still and the cooling of the absorbent liquid therein, the liquefied gas in the evaporator is caused to evaporate and pass back into the liquid in the still which now serves as an absorber. The liquefied gas during its evaporation in the evaporator, produces the desired cooling effect.

Although our improved device may be made of various sizes, and for use in refrigerators or cooling chambers of many different forms, we have selected, for purposes of illustration, forms adapted for use in the household sizes of refrigerators.

The evaporator is shown as including an upper chamber 11, a lower chamber 12 and a plurality of substantially vertical pipes 13 connecting these two chambers. If it is desired to give increased heat absorbing surface, the upper chamber may have a pair of downwardly inclined pipes 14 at opposite ends and connected by a header 16, and the lower chamber may have a pair of upwardly inclined pipes 17 connected by a header 18. The pipes 14 and 17 and the two headers 16 and 18 may be connected by vertical pipes 19 so that liquid may enter all of these pipes and as it evaporates the gas may flow to the upper chamber 11.

Preferably, certain of the pipes 13 at their upper ends in the chamber 11, terminate substantially flush with the lower surface of said chamber and others terminate at higher elevations so that there may be a down circulation through some of these pipes and an up flow of gas resulting from evaporation in other pipes.

As the important feature of our invention, the evaporator, whether constructed as above described or as a single chamber, or of other form, has at its upper part a cup, chamber or compartment 20, which is connected by a pipe 21 to the lowermost portion of the evaporator. The main gas outlet conduit 22 from the evaporator projects into and terminates within this chamber 20. The chamber 20 is in open communication with the upper part of the body of the evaporator, as for instance by ports 23, which are above the lower end of the conduit 22.

Preferably, the conduit 22 serves for the delivery of the liquefied refrigerant to the evaporator during the heating period and for the return of gaseous refrigerant from the evaporator during the cooling period.

In the operation of the apparatus, the liquefied refrigerant is delivered through the pipe 22 during the heating period and there may be delivered with this liquefied refrigerant some small quantity of the absorbent liquid. The parts are so designed in respect to the apparatus in which the evaporator is used that the liquid level in the evaporator will be above the lower end of the pipe 22, at the end of the heating period. Obviously, the liquid will stand at the same level in the body of the chamber 11 as it does in the chamber or compartment 20, due to the fact that these are in open communication through the pipes 21 and 13, and the lower chamber 12.

At the beginning of the cooling period, suction will be exerted on the conduit 22 and liquid will be drawn back from the evaporator through this conduit. Liquid so drawn out of the compartment 22 will be replaced by liquid rising into said compartment through the conduit 21 from the lowermost portion of the evaporator where there has accumulated, during the previous cooling period, the water or other unevaporated part of the liquid. This liquid delivered to the compartment 20 through the pipe 21 will be sucked back to the absorber or still until the liquid level in the evaporator drops below the level of the end of the conduit 22, then the main cooling operation may take place and the gas produced by the evaporation will enter the chamber 20 through the ports 23 and flow from the evaporator back to the absorber. It will thus be noted that at the beginning of each cooling period, liquid is withdrawn from the lowermost portion of the evaporator. Obviously, there might be a sump at the lower part of the chamber 12 into which the lower end of the pipe 21 projects.

By means of our invention we prevent the accumulation of any considerable quantity of absorbent liquid in the evaporator and which might interfere with the efficiency or desired operation if added to during each heating period and permitted to accumulate.

Figure 2:
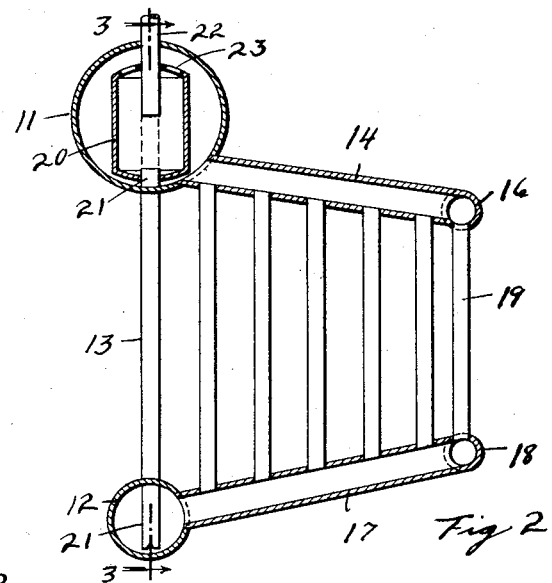
Fig. 2 is a vertical section through the evaporator shown in Fig. 1, said section being taken on the line 2—2 of Fig. 3.
Figure 3:
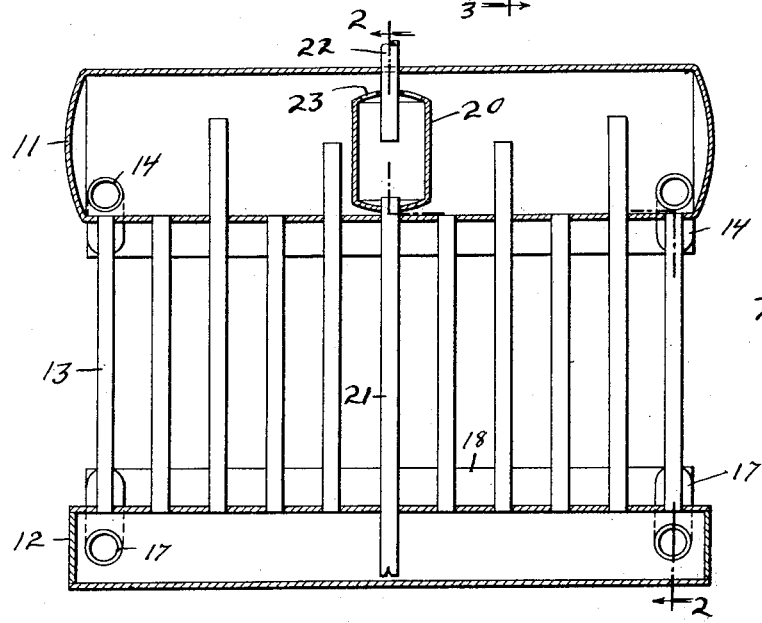
Fig. 3 is a section taken on the line 3—3 of Fig. 2.
Figure 4:
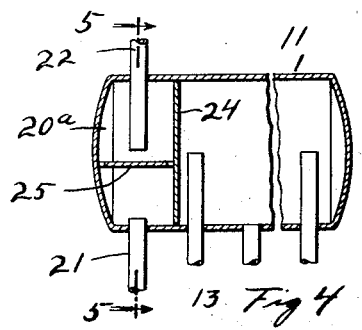
Fig. 4 is a sectional detail showing another form of construction, said section being taken on the line 4—4 of Fig. 5.
Figure 5:
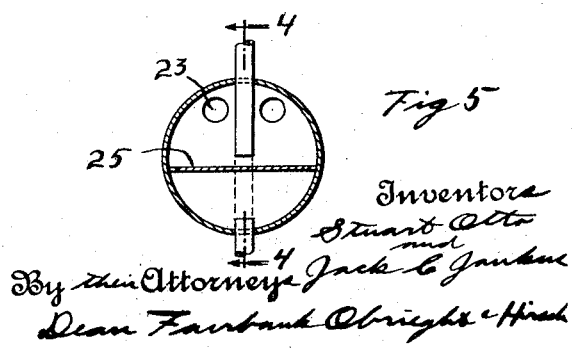
Fig. 5 is a section on the line 5—5 of Fig. 4.

In the form shown in Fig. 3 the chamber 20 is a separate vessel within the evaporator. This is not at all essential: for instance, the chamber may be formed by means of a partition, as shown in Figs. 4 and 5. Here the evaporator 11 has a partition 24, adjacent to one end so as to form a compartment 20ª, into which the conduits 21 and 22 project. In order to limit the upward flow of liquid in the conduit 21 during normal evaporating operation, and to prevent such liquid from going directly to the conduit 22, there is preferably provided a baffle between the ends of the two conduits. Such a baffle 25 is shown in Figs. 4 and 5. The baffle has notches at its edges to permit liquid to flow past it. The same kind of baffle may be employed in the chamber 20 shown in Figs. 2 and 3. The partition 24 may have the ports 23 therein adjacent to the upper edge. The normal operation requires that these ports be above the lower end of the pipe 22 and the conduit 22 should have its lower end at a higher level than the upper end of the conduit 21. By reason of the baffle 25 the main suction exerted by the conduit 22 when the liquid level is below the end of this conduit will be through the ports 23 rather than through the conduit 21.

It will of course be evident that there may be various other forms and arrangements of the receiver and pipe connections within the spirit of our invention and within the scope of the appended claims.

Having thus described our invention, what we claim as new and desire to secure by Letters Patent is:

1. An evaporator including an upper receiver, a lower receiver, a plurality of pipes connecting said receivers, a single conduit connected to the upper receiver for delivering liquefied refrigerant to the evaporator or withdrawing gasified refrigerant therefrom, a conduit leading from the lowest part of the evaporator, and a chamber within the upper receiver and enclosing the lower end of the first mentioned conduit and the upper end of the second mentioned conduit and opening at its upper end into said upper receiver.

2. An evaporator including an upper receiver, a lower receiver, a plurality of pipes connecting said receivers, a single conduit connected to the upper receiver and serving both for delivering liquefied refrigerant to the evaporator and for withdrawing gasified refrigerant therefrom, a conduit leading from the lowest part of the evaporator, and a chamber enclosing the lower end of the first mentioned conduit and the upper end of the second mentioned conduit and having a port at the upper part thereof communicating with the upper part of the evaporator.

3. An evaporator having a conduit connected to the upper part thereof for delivering liquefied refrigerant to the evaporator or withdrawing gasified refrigerant or liquid therefrom, a conduit leading from the lowest part of the evaporator, and a chamber enclosing the lower end of the first mentioned conduit and the upper end of the second mentioned conduit, and having its upper part in open communication with the upper part of the evaporator.

4. An evaporator having a chamber in the upper part thereof, and having a port at its upper part leading to the body of the evaporator, a conduit for delivering liquefied refrigerant to the evaporator and for withdrawing gasified refrigerant or liquid therefrom and terminating in said chamber below said port, and a conduit leading from the lower part of the evaporator and terminating in said chamber below the end of the first mentioned conduit.

5. An evaporator having an upper receiver, a lower receiver, a plurality of pipes connecting said receivers, a conduit connected to the upper receiver for delivering liquefied refrigerant to the evaporator and for withdrawing gasified refrigerant therefrom, said conduit terminating within said upper receiver below the top wall thereof, a conduit leading from the lower part of the lower receiver to a point in the upper receiver juxtaposed to but spaced below the lower end of the first mentioned conduit, and a chamber enclosing said conduit ends, and having an opening in the upper receiver, above the lower end of the first mentioned conduit.

6. An evaporator including an upper receiver, a lower receiver, a plurality of conduits connecting them, one or more of said conduits terminating in said upper receiver adjacent to the bottom thereof, and one or more terminating at a higher elevation in said upper receiver to facilitate downflow of the liquid refrigerant through the first mentioned conduit or conduits and upflow through the second mentioned conduit or conduits during the evaporation of the refrigerant in both receivers, the upper receiver having a single pipe connected thereto and serving alternately for the delivery of refrigerant to the evaporator and for the withdrawal of gasified refrigerant therefrom.

7. An evaporator including a chamber having a conduit terminating therein for the delivery and return of refrigerant, and a conduit connecting the lower part of said chamber with the lower part of the evaporator, said chamber having a port communicating with the upper part of the evaporator and disposed above the bottom of said chamber and above the lower end of said first mentioned conduit, whereby upon the application of suction to said first mentioned conduit liquid is returned through the latter from the bottom of the evaporator when the liquid in the chamber is above a predetermined level and gas is returned from the upper part of the evaporator when the liquid is below said level.

8. An evaporator including a receiver adapted to contain liquefied refrigerant, a chamber in the upper part of said receiver and having its upper end opening into the upper end of the receiver, a conduit connecting said chamber with the lower part of said evaporator, whereby the said liquid level is maintained in the chamber as in the receiver when said liquid level is above the bottom of the chamber, and a gas outlet conduit extending into said receiver and terminating within said chamber, below the opening of the latter into the receiver.

9. An evaporator having a main evaporating space and a chamber in the upper part thereof and of comparatively small capacity, the upper portion of said chamber communicating with the upper portion of said evaporation space, a conduit leading from the bottom of said evaporation space to said chamber, and a main gas outlet conduit for said evaporator and leading from the interior of said chamber at a point below the communication between said chamber and the upper part of said evaporation space.

STUART OTTO.
JACK C. JANKUS.